United States Patent [19]

Marrington et al.

[11] Patent Number: 4,757,505

[45] Date of Patent: Jul. 12, 1988

[54] COMPUTER POWER SYSTEM

[75] Inventors: S. Paul Marrington, Fyshwick, Australia; Paul Kiankhooy-Fard, San Diego; P. Zecos, Del Mar, both of Calif.; Geoffrey Rudaw, Nancet, N.Y.

[73] Assignee: Elgar Electronics Corp., San Diego, Calif.

[21] Appl. No.: 857,850

[22] Filed: Apr. 30, 1986

[51] Int. Cl.⁴ .............................................. G06F 11/00
[52] U.S. Cl. ..................................... 371/66; 364/200
[58] Field of Search ................... 371/66; 364/200, 900; 365/229

[56] References Cited

U.S. PATENT DOCUMENTS

| | | | |
|---|---|---|---|
| 3,167,685 | 1/1965 | Bade et al. | 371/66 X |
| 3,757,302 | 9/1973 | Pollitt | 371/66 X |
| 3,801,963 | 4/1974 | Chen | 364/200 |
| 4,412,284 | 10/1983 | Kerforne et al. | 364/200 |
| 4,451,742 | 5/1984 | Aswell | 371/66 X |
| 4,611,289 | 9/1986 | Coppola | 371/66 X |

Primary Examiner—Charles E. Atkinson
Attorney, Agent, or Firm—Gregory O. Garmong

[57] ABSTRACT

A backup computer power system for powering and controlling a computer which is otherwise powered by a main power source, when the main power source fails or is disconnected, wherein an auxiliary power supply provides power to the computer and an instruction set in the computer controllably shuts down the computer after first allowing optional operator intervention prior to initiation of the programmed shutdown. If the operator chooses to intervene, he can permit completion of the current operations or conduct a manual shutdown procedure. If the operator does not intervene within a predetermined period of time, the instruction set terminates the current activity of the computer, saves the software operating environment of the computer, and shuts down the computer. Optionally, the instruction set can then shut off the auxiliary power supply to save its capacity for later use. When the main power source is restored, the auxiliary power supply signals the computer, and the instruction set initiates normal startup within the constraints of the saved operating environment.

12 Claims, 2 Drawing Sheets

COMPUTER POWER SYSTEM

BACKGROUND OF THE INVENTION

This invention relates to electronic computer systems, and, more particularly, to a backup computer power system that supplies power during main power source interruption and controls sequencing of the computer during the shutdown and restarting after such an interruption.

Electronic computers now play a central role in most of the businesses of a modern society, and additionally have come to be important learning aids and tools in the home. Such computers include the large mainframe machines which process enormous amounts of data, large and small minicomputers that are now common in businesses and the home, and microcomputers which can be built into other devices for many purposes.

A common characteristic of all of these electronic computers is that they require electrical power to operate their various components, and in particular the usual approach is to provide power to the computer from the available main power line or source. As will be familiar to most persons, electrical power loss is occasionally experienced nearly everywhere, with varying degrees of frequency. For most appliances and machines powered by electricity, power outages are simply an inconvenience that temporarily halts operation, but does not result in any permanent loss or damage to the machine.

Electronic computers present a more complex problem when confronted with sudden and unexpected power losses. In a typical computer operation, data in the form of bits of information are retrieved from storage in memory, processed in a central processing unit, and the results of the processing are stored back in memory. Data or operating instructions may be retrieved from and stored to data files which are opened for access. Instructions in the form of keystrokes may be entered into the computer through a terminal. If the data or keystrokes should become lost or altered during the occurrence of a power loss, or if there is some alteration of the software operating environment as a result of the power loss, it may later be difficult or impossible to recover the information. Some types of potential losses and alterations are quite subtle in nature, and cannot be readily detected, making them even more serious problems because the computer user may obtain erroneous results with no warning and no clue as to their cause. Thus, one of the greatest dangers during any unintended shutdown is that the computer will be shut down to an undefined or ill-defined state, from which an orderly startup to achieve a usable state is very difficult because the beginning state is unknown.

To cite a more concrete example, if "the plug is pulled" without any prior provision for orderly shutdown, the computer may be in the process of transmission of information to peripheral devices under operator instructions at the moment the failure occurs. The operator cannot be certain of how much of the information was transmitted successfully, and of whether electrical irregularities such as spikes during failure may have altered the information. The operator cannot conveniently reconstruct the failure to determine whether the information transmitted to the peripheral device is correct and reliable. The status of the computer is therefore poorly defined, and the operator cannot be certain what would happen if he simply restarted the computer in the hope that it would restart without losing information. The operator then can choose to gamble on an orderly restart, or begin the entire computing operation over, if that is possible under the circumstances.

Major power losses are relatively rare in most places. Unfortunately, computers are typically sensitive to brief power failures lasting only a fraction of a second and to partial power failures that reduce the main power line voltage below the design limits of the computer. The computer may be vulnerable to power losses and fluctuations that may not even be noticeable to a person who is watching the computer, and may not significantly affect many other types of electrical devices. Both major and minor power losses can interrupt normal computer operations in a way that makes reconstruction of the status and restoration nearly impossible, because it is difficult to determine the exact time, status, and failure sequence.

As a response to the extreme sensitivity of computer systems to electrical interruptions, uninterruptable power supplies have been developed for nearly all types of computers. Typically, an uninterruptible power supply includes a battery power source that is tapped when the main power is interrupted, to provide a continuous flow of electrical power to the computer. The DC power provided by the battery is converted to AC power for use by the computer in an inverter that is ordinarily part of the uninterruptable power supply. Standby generators are ordinarily not relied upon as the primary backup, since generators usually require at least several seconds from a cold start before reaching their rated power output. Battery backup power sources provide highly satisfactory service during short power interruptions, and most computers having such an uninterruptible power source operate continuously through such interruptions. Uninterruptible power sources are now available for large business computers and for the smaller minicomputers found as stand-alone units in businesses and homes.

It is not possible to predict beforehand whether a power interruption will be a few seconds or hours in length. Uninterruptable power sources are usually built to supply the power needs of the computer for a period of a few minutes, as for 20 minutes. If the power is lost for longer periods, the batterys of the uninterruptible power source become exhausted, and power to the computer is lost. The result is then the same as if there were no backup available in the first place. When such a longer duration power outage occurs, the computer operator may not be available to shut down the computer in an orderly fashion to avoid loss of information during the shutdown. Even when a computer operator is available, he may be relatively untutored as to the correct procedures for shutting the computer down in an orderly fashion, again without loss of information. On the other hand, the operator may be experienced and may be able to respond to the power loss in a fully acceptable manner that is appropriate for the particular operation then underway.

Another important concern is that, once the main power is restored, the computer must be able to resume operation, recognizing the fact that its then-current software environment is that existing when the interruption occurred due to the power failure. The computer operating system must first be "booted" into the computer, and then the operating program reloaded and restarted. If no operator is present, it would be desirable to have an automatic restart capability, so that valuable computing time is not lost until the operator returns. If an operator is present, either a fully manual start or a preprogrammed restart could be accomplished, again depending upon a decision of the operator.

At the present time, there is a need for a "smart" backup power system which can provide backup power to the computer when main power is interrupted, provide for continuation of computer operations during power outages of short duration and also for orderly shutdown of the computer during longer outages, and provide for the possibility of operator intervention as necessary. Such a system should allow orderly restart of the computer, either with or without operator intervention. Moreover, such a backup power system should be a stand-alone, plug in system that does not require hardware modifications to the computer itself, since the need for hardware modifications would deter many small business and home users of computers from using such a back up power system. The present invention fulfills this need and further provides related advantages.

SUMMARY OF THE INVENTION

The present invention resides in a computer power system and a process for controlling a computer, which provides backup power in the event of a power failure of the main power source and also controls the orderly shutdown and restart of the computer in the event of such a main power failure. The invention allows for fully automatic operation, and manual intervention by the computer operator where desired. The computer power system thus leaves the computer in a well-defined state upon shutdown, so that startup can be conducted within a known software environment. The power system is plug compatible with many conventional computer systems, and no hardware modifications to the computer are necessary, except for the installation of a hard-wired communication line from the power supply to an available external port of the computer.

In accordance with the invention, a backup computer power system for powering and controlling a computer which otherwise is powered by a main power source, comprises an auxiliary power supply means for providing backup power to the computer, including an auxiliary power source, failure detection means for detecting failure of the main power source and for connecting the computer to the auxiliary power source, and then for determining restoration of the main power source and for reconnecting the computer to the main power source; signalling means for providing to the computer from the auxiliary power supply means a failure signal upon failure of the main power source and a restoration signal upon restoration of the main power source; instruction means stored in the computer for executing a preprogrammed shutdown sequence upon receipt of the failure signal from the signalling means and a preprogrammed restart sequence upon receipt of the restoration signal from the signalling means, the instruction means providing for operator intervention to defeat the preprogrammed shutdown and restart sequences prior to initiation of the preprogrammed shutdown sequence at the option of the operator, the preprogrammed shutdown sequence providing for the saving of the software operating environment and the shutdown of the computer by a preselected series of steps, and the preprogrammed restart sequence providing for the restoration of the software operating environment and the startup of the computer by a preselected series of steps, whereby the computer is restored to a preselected operating condition.

Most often, the shutdown sequence and startup sequence are selected to be those which the user software requires of a human operator to achieve shutdown and startup, although they may be varied as needed for specific situations. In a typical case, the shutdown sequence might save active memory and keystrokes from a terminal and then operate the normal shutdown required by the operator software. The startup sequence would conduct the normal startup and then restore the active memory and keystrokes so that the computer could resume operation from the point where it was interrupted.

In an optional embodiment, the power system also provides for disconnecting the computer from the auxiliary power source after the computer is shut down and no longer needs the auxiliary power, to save the power reserves of the backup. In such a preferred system, the preselected shutdown sequence further provides for disconnecting the computer from the auxiliary power source upon completion of the shutdown sequence, the signalling means further includes means for providing to the auxiliary power supply from the computer a disconnect signal, under control of the preprogrammed shutdown sequence, and the auxiliary power supply further includes disconnect control means for disconnecting the auxiliary power source from the computer upon receipt of the disconnect signal, whereby the auxiliary power source is not depleted after the shutdown sequence is complete. The power system also preferably provides for operator intervention prior to initiation of the preselected shutdown sequence, so that the operator can take control of the shutdown procedure, if desired. Such intervention is preferably provided by presetting a time delay before activation of the preselected shutdown sequence, during which time delay the computer operator is warned of the impending initiation of the shutdown sequence and permitted to take action as desired. During the period of time immediately preceding initiation of the preselected shutdown, however, the operator is not permitted to undertake a manual shutdown due to the possibility of leaving the computer in an uncertain state.

It will now be appreciated that the computer power system provides a combination of hardware backup power supply and interactive software control that enables the orderly control of the computer system during failures of the main power source, and enables an orderly restart of the computer after the main power source is restored. Operator intervention is possible, but not required, at several stages of the shutdown and restart sequences. The power system can be installed as an add-on to existing auxiliary power sources, or provided new with auxiliary power systems. No hardware modifications to the computer are necessary. The instruction set of the power system, which is stored in the computer memory, acts in much the same way as the systems programs of the computer, and is invisible to the user until needed. Other features and advantages of the present invention will be apparent from the following more detailed description, taken in conjunction with the accompanying drawings, which illustrate, by way of example, the principles of the invention.

DETAILED DESCRIPTION OF THE PREFERRED EMBODIMENT

Figure 1:
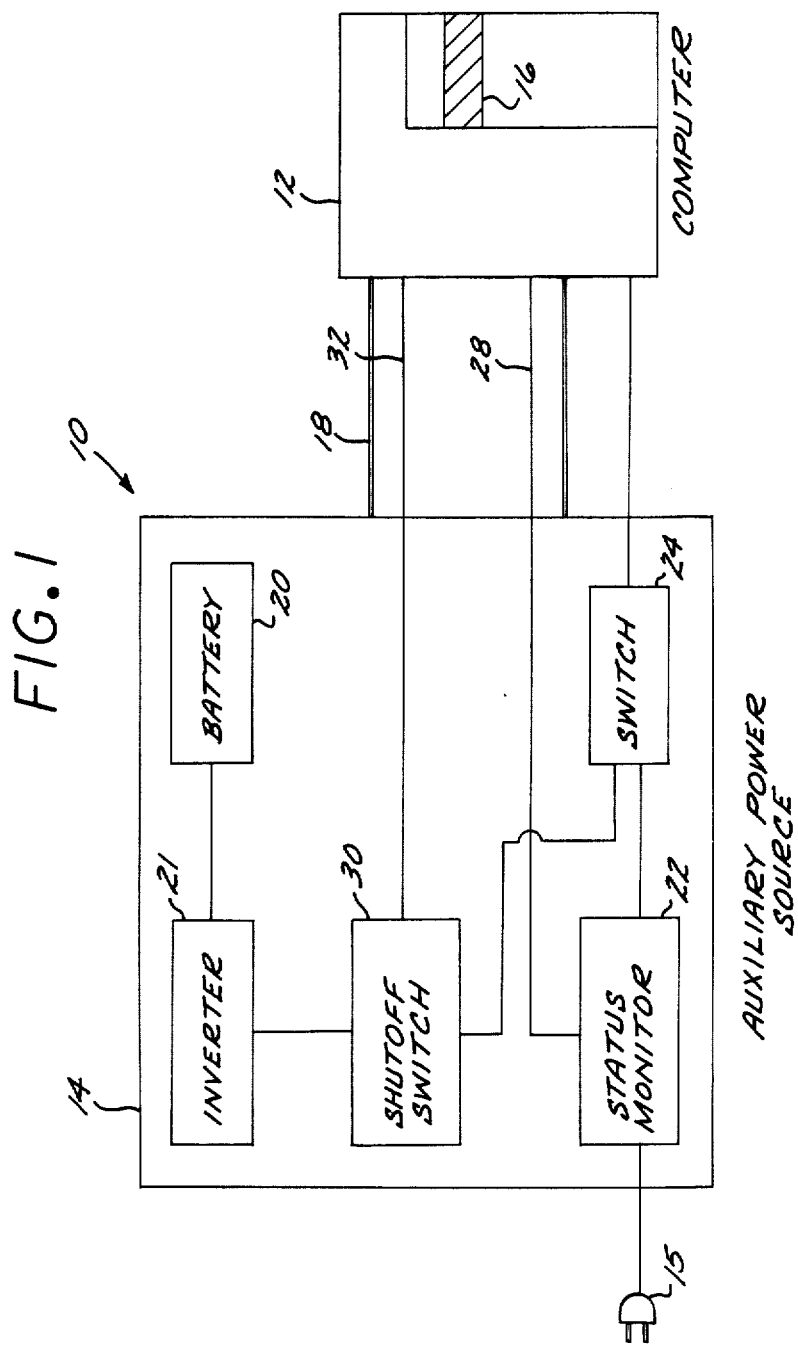
FIG. 1 is a schematic illustration of the relation between the computer and the elements of the backup computer power system.

Without the presence of a backup power system of any kind, a computer operates from the available power, termed the "main" power source, which is typically delivered as alternating current (AC) from a power company or a generator to the computer at a wall plug. The computer normally uses the available AC power. The power requirement for a computer can vary widely, from several watts for special purpose microcomputers, 50–1000 watts for a typical home or office personal computer or microcomputer, and many thousands of watts for large mainframe computers. If the main power source is lost completely, the computer ceases functioning within a fraction of a second. If there is a power interruption of very short duration, there may be an interruption to the processing of information that is so brief as to be unnoticed by the operator. However, even such a brief interruption can have severe adverse effects, since essential bits of information may be altered in an undetectable manner so that the software environment becomes undefined.

There are known systems for providing power temporarily during an interruption to the main power source, termed "backup" power. Such a backup power supply usually includes a battery or series of batterys with sufficient capacity to supply the voltage and current required by the computer for a period of time after the interruption to the main power source commences. The battery supplies direct current (DC) power to an inverter, which converts the DC power to AC power usable by the computer. The backup power supply has rechargeable batterys that are charged to their full capacity when the main power source is available, by a battery charger within the backup power supply. The backup power supply is usually plugged into the wall plug supplying the main power, and the computer is plugged into a plug in the backup power supply. Power is then usually provided to the computer through a relay that connects the computer directly to the main power source when the main power source is available. Circuitry within the backup power supply senses any interruption to the main power source and switches the computer to the battery power of the backup power supply to maintain a continuous supply of power to the computer. The switching can occur within a fraction of a second of an indication of loss of the main power source, which is sufficient to allow the computer to operate without interruption. When main power is restored, the backup power supply senses the restoration and switches the computer back to the main power supply. If recharging capability is provided in the backup power supply, recharging of the batterys from the main power commences. The backup power supply remains in a standby condition awaiting another main power failure.

This approach to a backup power supply works well for main power source interruptions lasting for a period shorter than the capacity of the batterys in the backup power supply. If the interruption lasts longer, then the power to the computer fails when the batterys are exhausted, with essentially the same result as though no backup power supply had been provided. However, an operator, if present, can monitor the loss of main power and possibly shut the computer down before the batterys are exhausted. This manual shutdown, if done correctly and prior to exhaustion of the batterys, can result in complete preservation of the software operating environment and data being processed by the computer and the ability to execute a restart under controlled conditions when the operator senses restoration of the main power. On the other hand, if no operator is present or if the operator who happens to be present is not sufficiently knowledgeable about the particular user program then being run on the computer or about the computer generally, it may not be possible to execute an orderly shutdown of the computer before the batterys are exhausted. In this event, there may be a partial or total loss of data and program status within the computer, or damage to the peripheral devices such as hard disks. If even a partial loss of data is suspected, it must also be expected that the data within the memory of the computer and any files open at failure are suspect.

In accordance with the present invention and as illustrated in FIG. 1, a backup computer power system 10 for powering and controlling a computer 12 includes an auxiliary power source 14 that provides backup power to the computer 12 for a period of time after the failure of a main power source 15. Within the memory of the computer 12 is instruction means, schematically illustrated in FIG. 1 as a block of memory 16, which controls the sequence of processing within the computer 12 after a main power failure has occurred, and, optionally, the operation of the auxiliary power source 14 after a main power failure has occurred. Signalling means i8 provides a status signal to the computer 12 from the auxiliary power source 14 upon interruption of the main power, and a further status signal to the computer 12 from the auxiliary power source i4 upon restoration of the main power.

The hardware of the computer 12 is that purchased from the manufacturer, and does not itself form part of the invention. The computer 12 will typically include a core memory, where the instruction means is stored. The computer 12 also typically has peripheral devices of several types for additional memory storage and input/output functions. It is preferred that the peripheral devices not be powered through the auxiliary power source 14, since the peripheral devices consume large amounts of power and reduce the period of effectiveness of the auxiliary power source 14. If a particular application requires that one or more peripheral devices, such as a keyboard terminal or a CRT display, operate without interruption when the main power source 15 fails, such peripheral devices may be powered through the auxiliary power source 14.

The auxiliary power source 14 includes a battery 20 which supplies DC power to an inverter 21, which converts the DC power to AC power and supplies this power to the computer 12 in the event of a failure of the main power supply 15. Normally, when main power is available, a switch 24 is positioned to supply power to the computer 12 directly from the main power source 15. A main power status monitor 22 continuously monitors the main power supply to detect a loss of power. If a loss of main power is detected, the switch 24 is operated by the status monitor 22 to switch the computer 12 to the inverter 21 as its source of power. Upon restoration of main power, the status monitor 22 again operates the switch 24, to reconnect the computer 12 to the main power source 15.

Upon detecting a loss of main power, the status monitor 22 also sends a main power out signal to the computer 12 through the signalling means 18. The signalling means includes a cable 28 extending from the status monitor 22 to the computer 12, across which the main power out signal is sent. If no provision for the signalling means 18 were made, the computer would have no information that there had been a loss of main power and that it was later restored, as the function of the auxiliary power source i4 is to maintain a level of power to the computer 12 without interruption.

Optionally, the auxiliary power source 14 also includes a shutoff switch 30 between the battery 20 or the inverter 21, and the computer 12, so that the computer 12 can be disconnected from the battery 20 and shut down, even when the main power source 15 is off and the computer 12 is operating from battery power. The purpose of this shutoff switch 30 is to conserve battery power in the event of a loss of main power and an orderly shutdown of the computer 12 well prior to exhaustion of the battery 20. The shutoff switch 30 is normally closed, to allow a direct connection from the battery 20 to the computer 12 when the main power source 15 is off. The shutoff switch 30 may be operated to the open position by a shutoff signal provided from the computer 12 through another cable 32 of the signalling means 18, as schematically illustrated in FIG. 1.

The computer 12 contains a set of instructions in the block of memory 16. These instructions provide the computer with a sequence of events to be followed upon receipt of a main power out signal or a negativing of that signal, indicating restoration of the main power. Optionally, the instructions also provide for transmitting a shutoff signal to the auxiliary power source 14.

Figure 2:
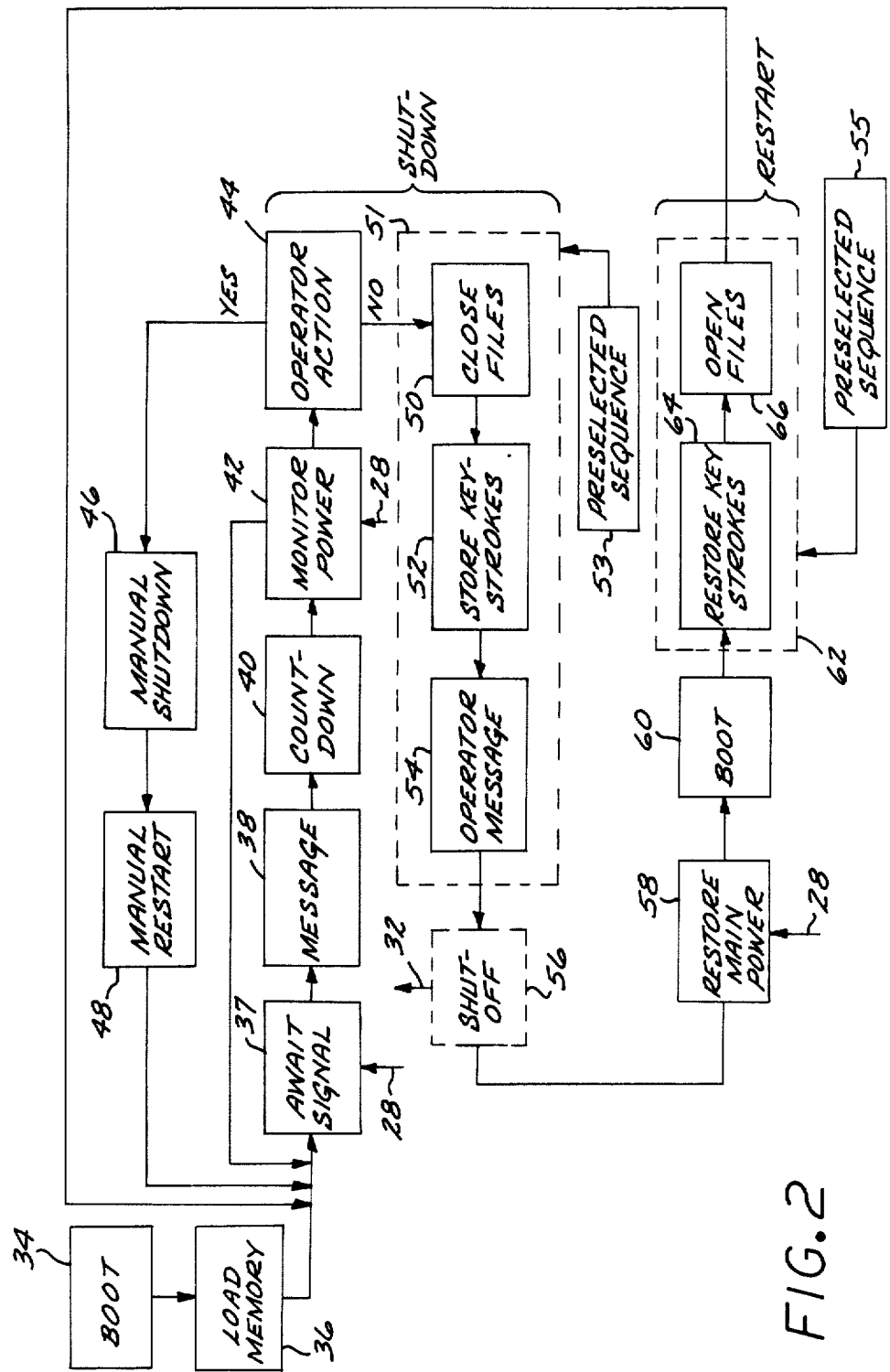
FIG. 2 is a block diagram of the major functions performed by the instruction set of the power system.

The block diagram of FIG. 2 illustrates the logic of the instruction set within the block of memory 16, and its interrelation with the auxiliary power source 14 and the other systems and program functions of the computer 12. When the computer 12 is started, there must be a provision to generate the initial instructions. These instructions, which are part of the systems program of the computer 12, are known as the "bootstrap loader" or "boot" 34. Part of the function of the boot 34 is to load the instructions into the memory 16, illustrated by the block 36. After the memory 16 is loaded, there is a repeated checking of the status of the main power out signal, numeral 28, to monitor for a loss of the main power source 15 that would initiate the timing before a controlled shutdown. If the power out signal continues to indicate that main power is available, the instruction means progresses no further through its sequence, but continues to monitor the power status as a background function of the computer.

Upon receipt of a power out signal indicating a loss of main power and operation of the switch 24 to connect the computer 12 to the battery 20 through the inverter 21, a message, numeral 38, informs the operator that power has been lost. At this time, or at any time before an automatic shutdown sequence 51 commences, the operator may manually shut the computer system down. Simultaneously, an automatic shutdown countdown 40 begins. The shutdown countdown reflects the predetermined time allowed to the operator to perform manual shutdown, prior to initiation of the automatic shutdown sequence 51. Typically, a period of time of about 5 minutes is allowed for the operator to begin manual shutdown, before automatic shutdown begins. During this period, the status of the main power out switch 16 is continuously monitored, at numeral 42. If the main power is restored, normal computer operations are resumed without the need for either a manual or automatic shutdown. The systems and user programs of the computer continue to operate during the countdown.

If there is operator intervention 44 within the predetermined time period, manual shutdown 46 is performed. Later, when main power is restored, a manual restart 48 is performed in a manner consistent with the manual shutdown procedures.

If there is no operator intervention 44, automatic shutdown 51 is commenced. The automatic shutdown 51 follows a procedure that is defined prior to computer operation at the time the computer power system software is loaded into the computer, and is indicated as numeral 53. When the computer power system software is loaded, an instruction defines an automatic shutdown sequence 51 that is appropriate for the user software being run on the computer. One common approach is to define an automatic shutdown sequence 51 that mimics the procedures that a human operator follows when he shuts down the system under normal conditions. As those skilled in the art will recognize, most common user software systems have a defined standard shutdown sequence of keystrokes. For example, a user program may require the keystroke "F10" to store the user file, a keystroke "9" to return to the operating system, and a keystroke "X" to park the disk drive head. The preselected automatic shutdown sequence 51 can then simply repeat those keys "F10", "9" and "X" in that order, whereby the computer is shut down in the same orderly fashion that the operator would follow if he were present. The power supplied by the backup power supply 14 provides time to execute these commands.

As will be appreciated, many different automatic sequences can be defined, at the option of the operator. FIG. 2 illustrates yet another option to that stated above. In this approach, during automatic shutdown all user memory files currently open are closed, numeral 50. Possible loss or alteration of data is thereby prevented. Previously entered keystrokes of a keyboard input/output device are stored, numeral 52, since these keystrokes may reflect special operating instructions needed in restarting, that may not be recalled by the operator or otherwise available, particularly during an automatic restart of the computer. A message is output, numeral 54, to the operator informing him of the automatic shutdown. When these functions are complete, optionally the shutoff signal 32 is sent, numeral 56, to the auxiliary power supply 14 to conserve battery power. The automatic shutdown is then complete. Specialized shutdown procedures tailored to a particular user's needs may be provided, including, for example, the shutdown of equipment operating under computer control in real time or completion of critical calculations prior to exhaustion of battery power.

An automatic restart capability is also provided, as further illustrated in FIG. 2. In a manner similar to that of shutdown, a preselected sequence 55 is provided to an automatic restart sequence 62 before computer operation begins. Upon receipt of a main power restored signal, numeral 58, the computer 12 is again booted, numeral 60, to establish an environment wherein further procedures may be accomplished. The automatic restart sequence 62 performs the necessary procedures to restart the computer in the desired manner. In the example wherein "F10", "9", and "X" keys shut the computer down, a pattern of keys "1" on a main menu, "any key", "space bar" and the name of the user file may be required to restart the program at its point of interruption. The preselected sequence 55 provides this sequence of keystrokes from memory during restart, whereupon the computer is restored to its status before failure in an orderly manner without the loss of information.

Other restart procedures are possible. To conclude the example illustrated for the shutdown sequence 51 in FIG. 2, the inverse procedure may be followed during the restart sequence 62. Keystrokes are restored to memory, numeral 64, and previously closed files are reopened and made available, numeral 66. The computer is then restored to its status prior to the interruption of main power. The systems and user programs proceed, and the computer power system returns to monitoring and checking the status of the main power, numeral 37.

In implementing the above procedure, numerous flags and reset features are provided to handle housekeeping functions and so that the program can be reentered under a variety of conditions. The precise procedures are set forth in the program listing attached hereto as Exhibit A and herein incorporated by reference. The computer power system of the present invention has important advantages not heretofore available in backup power supplies or elsewhere. An automatic shutdown/startup sequence is provided, which handles control and housekeeping functions in the event of long-term main power failure. The automatic sequences are preselected by the operator, so that computer operations can proceed in an orderly manner in the event of a main power failure. The result of a main power failure is therefore a well-defined software environment, which facilitates restart of the computer when power is restored. No modification to the computer is required. An operator may intervene in the shutdown procedure, but if there is no intervention, shutdown proceeds automatically according to the preselected sequence. Although particular embodiments of the invention have been described in detail for purposes of illustration, various modifications may be made without departing from the spirit and scope of the invention. Accordingly, the invention is not to be limited except as by the appended claims.

What is claimed is:

1. A backup computer power system for powering and controlling a computer which otherwise is powered by a main power source comprising:
   auxiliary power supply means for providing backup power to the computer, including
      an auxiliary power source including a battery,
      an automatic power source selector switch, and
      a status monitor that, upon failure of the main power source, operates said power source selector switch to connect the computer to the auxiliary power source and provides a failure indication output, and that, upon restoration of the main power source, operates said power source selector switch connect the computer to the main power source and provides a power restoration indication output;
   signalling means for providing the failure indication output and the power restoration indication output to the computer from said status monitor; and
   instruction means stored in the computer, said instruction means including
      shutdown code for executing a preprogrammed shutdown sequence upon receipt of the failure indication output from said signalling means;
      restart code for executing a preprogrammed restart sequence upon receipt of the power restoration indication output from said signalling means; and
      intervention code providing for operator intervention to defeat the preprogrammed shutdown prior to initation of the preprogrammed shutdown sequence at the option of the operator.

2. The power system of claim 1, wherein
   the preprogrammed shutdown sequence further provides for disconnecting the computer from said auxiliary power source upon completion of the shutdown sequence,
   said signalling means further includes means for providing to the auxiliary power supply from the computer a disconnect signal, under control of the preprogrammed shutdown sequence, and
   said auxiliary power supply further includes disconnect control means for disconnecting the auxiliary power source from the computer upon receipt of the disconnect signal, whereby said auxiliary power source is not depleted after the shutdown sequence is complete.

3. The auxiliary power supply means of claim 1, wherein the instruction means provides for operator intervention by presetting a time delay before activation of the preprogrammed shutdown sequence, during which time delay the computer operator is warned of the impending initiation of the shutdown sequence and permitted to take action.

4. The power system of claim 1, wherein said auxiliary power source includes a battery.

5. The power system of claim 1, wherein said signalling means includes a cable extending from the computer to said auxiliary power supply means.

6. The power system of claim 1, wherein said instruction means includes a set of keystrokes for controlling shutdown.

7. The power system of claim 6, wherein the keystrokes are provided to said instruction means at the time said instruction means is loaded into the computer.

8. The power system of claim 1, wherein said instruction means includes a set of keystrokes for controlling startup.

9. The power system of claim 8, wherein the keystrokes are provided to said instruction means at the time said instruciton means is loaded into the computer.

10. The power system of claim 1, wherein said instruction means saves data input from peripheral devices during shutdown.

11. The power system of claim 10, wherein said data are keystrokes.

12. The power system of claim 10, wherein the saved data are restored during restart.

* * * * *